United States Patent
Pajor et al.

(10) Patent No.: US 9,576,073 B2
(45) Date of Patent: Feb. 21, 2017

(54) DISTANCE QUERIES ON MASSIVE NETWORKS

(71) Applicant: Microsoft Corporation, Redmond, WA (US)

(72) Inventors: Thomas Pajor, Mountain View, CA (US); Daniel Delling, Sunnyvale, CA (US); Renato F. Werneck, San Francisco, CA (US); Andrew V. Goldberg, Emerald Hills, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 251 days.

(21) Appl. No.: 14/293,213

(22) Filed: Jun. 2, 2014

(65) Prior Publication Data

US 2015/0347629 A1    Dec. 3, 2015

(51) Int. Cl.
  *G06F 17/30*      (2006.01)
  *G06F 17/16*      (2006.01)
  *G01C 21/34*      (2006.01)
  *H04L 12/54*      (2013.01)

(52) U.S. Cl.
  CPC ..... *G06F 17/30964* (2013.01); *G01C 21/3446* (2013.01); *G06F 17/16* (2013.01); *G06F 17/30958* (2013.01); *H04L 12/5689* (2013.01)

(58) Field of Classification Search
  CPC combination set(s) only.
  See application file for complete search history.

(56) References Cited

U.S. PATENT DOCUMENTS

| 8,234,297 | B2 | 7/2012 | He |
| 8,364,717 | B2 | 1/2013 | Delling et al. |
| 2012/0158639 | A1* | 6/2012 | Moore ............ G06F 17/30533 706/55 |
| 2012/0250535 | A1* | 10/2012 | Delling ................ H04L 45/12 370/252 |
| 2012/0254153 | A1 | 10/2012 | Abraham et al. |
| 2013/0144524 | A1 | 6/2013 | Abraham et al. |
| 2013/0261965 | A1 | 10/2013 | Delling et al. |
| 2013/0339352 | A1 | 12/2013 | Jin et al. |

OTHER PUBLICATIONS

"International Search Report and Written Opinion Issued in PCT Patent Application No. PCT/US2015/033103", Mailed Date: Aug. 4, 2015, 12 Pages.

"Second Written Opinion Issued in PCT Application No. PCT/US2015/033103", Mailed Date: Jan. 26, 2016, 8 Pages.

(Continued)

*Primary Examiner* — Etienne Leroux
(74) *Attorney, Agent, or Firm* — John S. Jardine; Dan Choi; Micky Minhas

(57) ABSTRACT

Distance query techniques are provided that are robust to network structure, scale to large and massive networks, and are fast, straightforward, and efficient. A hierarchical hub labeling (HHL) technique is described to determine a distance between two nodes or vertices on a network. The HHL technique provides indexing by ordering vertices by importance, then transforming the ordering into an index, which enables fast exact shortest-path distance queries. The index may be compressed without sacrificing its correctness.

19 Claims, 9 Drawing Sheets

(56) References Cited

OTHER PUBLICATIONS

Geisberger, et al., "Contraction Hierarchies: Faster and Simpler Hierarchical Routing in Road Networks", In Proceedings of the 7th international conference on Experimental algorithms, Jun. 2008, 15 pages.

Cohen, et al., "Reachability and Distance Queries via 2-Hop Labels", In Proceedings of the 13th annual ACM-SIAM symposium on Discrete algorithms, Jan. 6, 2002, 10 pages.

Sanders, et al., "Highway Hierarchies Hasten Exact Shortest Path Queries", In Proceedings of the 13th annual European conference on Algorithms, Oct. 3, 2005, 12 pages.

Engineer, Faramroze, "Fast Shortest Path Algorithms for Large Road Networks", In Proceedings of 36th annual ORSNZ conference, Mar. 25, 2014, 10 pages.

Abraham, et al., "HLDB: Location-Based Services in Databases", In Proceedings of 20th International Conference on Advances in Geographic Information Systems, Nov. 6, 2012, pp. 339-348.

Abraham, et al., "A Hub-Based Labeling Algorithm for Shortest Paths in Road Networks", In Proceedings of the 10th International Conference on Experimental Algorithms, May 6, 2011, 12 pages.

Abraham, et al., "Hierarchical Hub Labelings for Shortest Paths", In Proceedings of the 20th Annual European conference on Algorithms, Apr. 2012, 15 pages.

Akiba, et al., "Fast Exact Shortest-Path Distance Queries on Large Networks by Pruned Landmark Labeling", In Proceedings of ACM SIGMOD International Conference on Management of Data, Jun. 22, 2013, pp. 349-360.

Akiba, et al., "Shortest-Path Queries for Complex Networks: Exploiting Low Tree-width Outside the Core", In Proceedings of 15th International Conference on Extending Database Technology, Mar. 26, 2012, pp. 144-155.

Albert, et al., "Diameter of the World-Wide Web", In Proceedings of Nature, vol. 401, Sep. 9, 1999, 1 page.

Boccaletti, et al., "Complex Networks: Structure and Dynamics", In Journal of Physics Report, vol. 424, Issue 4-5, Feb. 2006, 2 pages.

Boldi, et al., "Layered Label Propagation: A MultiResolution Coordinate-Free Ordering for Compressing Social Networks", In Proceedings of 20th International Conference on World Wide Web, Mar. 28, 2011, pp. 587-596.

Boldi, et al., "The WebGraph Framework I: Compression Techniques", In Proceedings of the 13th International Conference on World Wide Web, May 17, 2004, pp. 595-602.

Botea, Adi, "Ultra-fast Optimal Pathfinding without Runtime Search", In Proceedings of 7th AAAI Conference on Artificial Intelligence and Interactive Digital Entertainment, Oct. 10, 2011, 6 pages.

Botea, et al., "Path Planning with Compressed All-Pairs Shortest Paths Data", In Proceedings of the 23rd International Conference on Automated Planning and Scheduling, Feb. 2013, 5 pages.

Chen, et al., "A Compact Routing Scheme and Approximate Distance Oracle for Power-Law Graphs", In Journal Transactions on Algorithms, vol. 9, Issue 1, Dec. 2012, 26 pages.

Cohen, et al., "Scalable Similarity Estimation in Social Networks: Closeness, Node Labels, and Random Edge Lengths", In Proceedings of Conference on Online Social Networks, Oct. 7, 2013, 12 pages.

Cohen, et al., "Reachability and Distance Queries via 2-Hop Labels", In Proceedings 13th Annual ACM-SIAM Symposium on Discrete Algorithms, Jan. 6, 2002, pp. 937-946.

Sarma, et al., "A Sketch-Based Distance Oracle for Web-Scale Graphs", In Proceedings of 3rd ACM International Conference on Web Search and Data Mining, Feb. 4, 2010, pp. 401-410.

Delling, et al., "Customizable Route Planning", In Proceedings of the 10th International Conference on Experimental Algorithms, May 5, 2011, 12 pages.

Delling, et al., "Hub Label Compression", In Proceedings of 12th International Symposium on Experimental Algorithms, Jun. 5, 2013, 12 pages.

Demetrescu, et al., "The Shortest Path Problem: Ninth DIMACS Implementation Challenge", In Publication of DIMACS: Series in Discrete Mathematics and Theoretical Computer Science, Aug. 15, 2009, 2 pages.

Gavoille, et al., "Distance Labeling in Graphs", In Proceedings of 12th Annual ACM-SIAM Symposium on Discrete Algorithms, Jan. 7, 2001, pp. 210-219.

Geisberger, et al., "Exact Routing in Large Road Networks Using Contraction Hierarchies", In Publication of Transport Science, vol. 46, Issue 3, Apr. 5, 2012, 1 pages.

Goldberg, et al., "Separating Hierarchical and General Hub Labelings", In Mathematical Foundations of Computer Science, vol. 8087, Aug. 26, 2013, 12 pages.

Gubichev, et al., "Fast and Accurate Estimation of Shortest Paths in Large Graphs", In Proceedings of 19th ACM International Conference on Information and Knowledge Management, Oct. 26, 2010, pp. 499-508.

He, et al., "BLINKS: Ranked Keyword Searches on Graphs", In Proceedings of ACM SIGMOD International Conference on Management of Data, Jun. 12, 2007, pp. 305-316.

Holtgrewe, et al., "Engineering a Scalable High Quality Graph Partitioner", In IEEE International Symposium on Parallel & Distributed Processing, Apr. 19, 2010, 12 pages.

Jin, et al., "A Highway-Centric Labeling Approach for Answering Distance Queries on Large Sparse Graphs", In Proceedings of ACM SIGMOD International Conference on Management of Data, May 20, 2012, pp. 445-456.

Koch, et al., "SteinLib: An Updated Library on Steiner Tree Problems in Graphs", In Technical Report ZIB-Report 00-37, Nov. 2000, 37 pages.

Leskovec, et al., "Predicting Positive and Negative Links in Online Social Networks", In Proceedings of the 19th International Conference on World Wide Web, Apr. 26, 2010, pp. 641-650.

Leskovec, et al., "Signed Networks in Social Media", In Proceedings of SIGCHI Conference on Human Factors in Computing Systems, Apr. 10, 2010, pp. 1361-1370.

Leskovec, et al., "Graphs over Time: Densification Laws, Shrinking Diameters and Possible Explanations", In Proceedings of 11th ACM SIGKDD International Conference on Knowledge Discovery in Data Mining, Aug. 21, 2005, pp. 177-187.

Leskovec, et al., "Community Structure in Large Networks: Natural Cluster Sizes and the Absence of Large Well-Defined Clusters", In Internet Mathematics, vol. 6, Issue 1, Jan. 30, 2011, 2 pages.

Magnien, et al., "Fast Computation of Empirically Tight Bounds for the Diameter of Massive Graphs", In Journal of Experimental Algorithmics, vol. 13, Article No. 10, Apr. 17, 2009, 7 pages.

Ripeanu, et al., "Mapping the Gnutella Network: Properties of Large-Scale Peer-to-Peer Systems and Implications for System Design", In Journal IEEE Internet Computing, vol. 6, Issue 1, Jan. 2002, 12 pages.

Mislove, et al., "Measurement and Analysis of Online Social Networks", In Proceedings of 7th ACM SIGCOMM Conference on Internet Measurement, Oct. 24, 2007, pp. 29-42.

Peleg, David, "Proximity-Preserving Labeling Schemes", In Journal of Graph Theory, vol. 33, Issue 3, Mar. 2000, 2 pages.

Qiao, et al., "Approximate Shortest Distance Computing: A Query-Dependent Local Landmark Scheme", In IEEE Transactions on Knowledge and Data Engineering, Jan. 2014, pp. 55-68.

Rahman, et al., "Observing Local and Global Properties of Metabolic Pathways: 'Load Points' and 'Choke Points' in the Metabolic Networks", In Bioinformatics, vol. 22, Issue 14, May 8, 2006, pp. 1767-1774.

Richardson, et al., "Trust Management for the Semantic Web", In Proceedings of 2nd Internatonal Semantic Web-ISWC, Oct. 20, 2003, 17 pages.

Sander, et al., "Efficient Traversal of Mesh Edges using Adjacency Primitives", In Journal of ACM Transactions on Graphics, vol. 27, No. 5, Dec. 2008, pp. 144:1-144:9.

Schenkel, et al., "HOPI: An Efficient Connection Index for Complex XML Document Collections", In Advances in Database Technology—EDBT 2004, Mar. 14, 2004, pp. 237-255.

(56) References Cited

OTHER PUBLICATIONS

Sturtevant, Nathan R., "Benchmarks for Grid-Based Pathfinding", In IEEE Transactions on Computational Intelligence and AI in Games, Jun. 2012, pp. 144-148.

Sturtevant, et al., "A Comparison of High-Level Approaches for Speeding Up Pathfinding", In Proceedings of 6th AAAI Conference on Artificial Intelligence and Interactive Digital Entertainment, Oct. 11, 2010, 7 pages.

Endre Tarjan, Robert, "Data Structures and Network Algorithms", In Publication of Conference Series in Applied Mathematics, Feb. 1, 1984, 3 pages.

Thorup, et al., "Approximate Distance Oracles", In Journal of the ACM, vol. 52, No. 1, Jan. 2005, 24 pages.

Tretyakov, et al., "Fast Fully Dynamic Landmark-based Estimation of Shortest Path Distances in Very Large Graphs", In Proceedings of 20th ACM International Conference on Information and Knowledge Management, Oct. 24, 2011, pp. 1785-1794.

Wei, Fang, et al., "TEDI: Efficient Shortest Path Query Answering on Graphis", In Proceedings of 2010 ACM SIGMOD International Conference on Management of Data, Jun. 6, 2010, pp. 99-110.

Yahia, et al., "Efficient Network-Aware Search in Collaborative Tagging Sites", In Proceedings of the VLDB Endowment, vol. 1, Issue 1, Aug. 23, 2008, pp. 710-721.

Zhao, et al., "Orion: Shortest Path Estimation for Large Social Graphs", In Proceedings of the 3rd Conference on Online Social Networks, Jun. 22, 2010, 9 pages.

Zhao, et al., "Efficient Shortest Paths on Massive Social Graphs", In Proceedings of 7th International Conference on Collaborative Computing: Networking, Applications, and Worksharing, Oct. 2011, 10 pages.

"International Preliminary Report on Patentability Issued in PCT Application No. PCT/US2015/033103", Mailed Date: Apr. 20, 2016, 09 Pages.

* cited by examiner

DISTANCE QUERIES ON MASSIVE NETWORKS

BACKGROUND

Answering point-to-point distance queries in graphs is a fundamental building block for many applications in domains such as social networks, search, computational biology, computer networks, and road networks. Although distance queries can be answered by a well-known method attributed to Dijkstra in almost linear time, on large graphs this can take several seconds. This is too slow for most applications, which may need to run thousands or even millions of distance queries. For this reason, there has been steady progress in the design of more efficient techniques. The general approach is to build an index from the input graph to accelerate on-line queries. For complex networks, both exact and approximate algorithms have been developed.

As an example, on road networks, most recent algorithms are exact. Existing computer programs known as road-mapping programs provide digital maps, often complete with detailed road networks down to the city-street level. Typically, a user can input a location and the road-mapping program will display an on-screen map of the selected location. Several existing road-mapping products typically include the ability to calculate a best route between two locations. In other words, the user can input two locations, and the road-mapping program will compute the travel directions from the source location to the destination location. The directions are typically based on distance, travel time, and certain user preferences, such as a speed at which the user likes to drive, or the degree of scenery along the route. Computing the best route between locations may require significant computational time and resources.

Some programs compute shortest paths using variants of the Dijkstra method. Note that in this sense "shortest" means "least cost" because each segment (e.g., road segment) is assigned a cost or weight not necessarily directly related to the segment's length. By varying the way the cost is calculated for each segment, shortest paths can be generated for the quickest, shortest, or preferred routes. Dijkstra's original method, however, is not always efficient in practice, due to the large number of locations and possible paths that are scanned. Instead, many known programs use heuristic variations of Dijkstra's method.

More recent developments utilize a two-stage process comprising a preprocessing phase and a query phase. During the preprocessing phase, the graph or map is subject to an off-line processing such that later real-time queries between any two points (e.g., destinations) on the graph can be made more efficiently. Known examples of preprocessing algorithms use geometric information, hierarchical decomposition, and A* search.

Although there are many techniques that are specialized for some types of inputs, none of these techniques are robust to network structure, scale to large or massive networks, and are fast, straightforward, and efficient.

SUMMARY

Distance query systems and methods are provided that are robust to network structure, scale to large and massive networks, and are fast, straightforward, and efficient. A hierarchical hub labeling (HHL) technique is described. In an implementation, the HHL technique provides indexing by ordering vertices by importance, then transforming the ordering into an index (labeling), which enables fast exact shortest-path distance queries. In an implementation, the index may be compressed without sacrificing its correctness.

In an implementation, a graph comprising a plurality of vertices is received as input at a computing device. A plurality of labels for each vertex of the graph is generated by the computing device, wherein for each vertex, each label comprises both a set of vertices referred to as hubs and the distances between the hubs in the label and the vertex. Hierarchical hub labeling preprocessing is performed to generate the labels, and data corresponding to the vertices and labels is stored as preprocessed graph data in storage associated with the computing device. The preprocessed graph data may be used in response to a subsequent query to determine a distance between two nodes (or vertices) of the network (e.g., on a massive network associated with a social network, search, computational biology, a computer network, and/or a road network.)

In an implementation, performing hierarchical hub labeling preprocessing comprises determining an order of the vertices of the graph, determining an index based on the order, and optionally performing compression on the index to reduce the size of the index.

In an implementation, determining a distance between two nodes (or vertices) on a massive network comprises preprocessing, at a computing device, a graph comprising a plurality of vertices and arcs to generate preprocessed data comprising a plurality of labels for each vertex of the graph, wherein for each vertex, each label comprises a set of vertices and the distances between the vertices in the set of vertices and the vertex, wherein the preprocessing comprises determining an order of the vertices of the graph, and determining an index based on the order. A query is received at the computing device, and a source vertex and a destination vertex are determined based on the query, by the computing device. The computing device performs a distance computation on the preprocessed data with respect to the source vertex and the destination vertex to determine a distance between the source vertex and the destination vertex, and outputs the distance.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
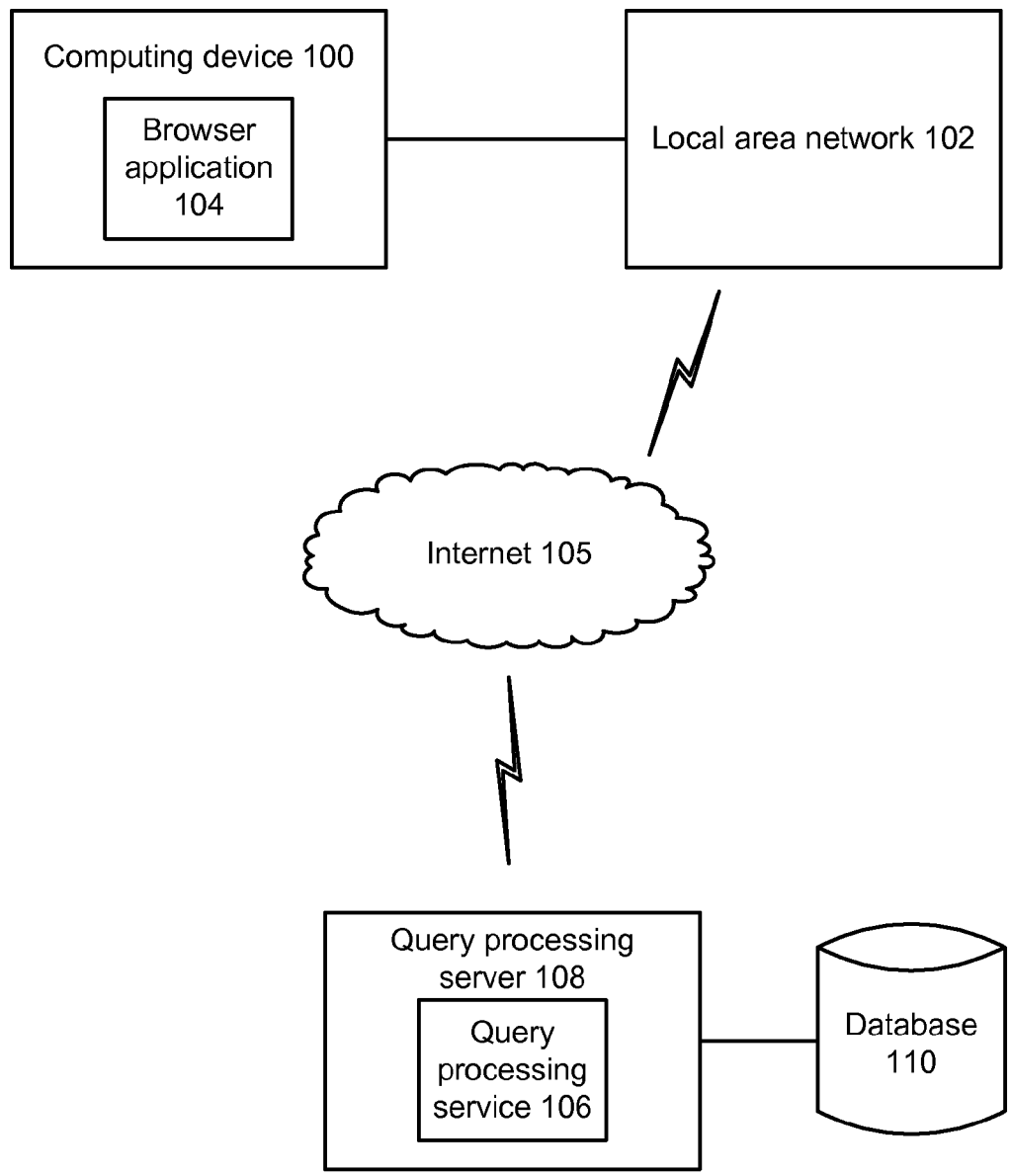
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), smart phone, cell phone, or any WAP-enabled device or any other computing device capable of interfacing directly or indirectly with a network. An example computing device 100 is described with respect to the computing device 900 of FIG. 9, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc.), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a query processing service 106, running on a query processing server 108. The query processing server 108 hosts a database 110 of nodes (also may be referred to as vertices in some implementations) pertaining to domains such as social networks, search, computational biology, computer networks, and road networks, along with relationships between the stored nodes or vertices.

A user of the computing device 100 typically enters start and destination nodes (or locations, vertices, or two points, for example) as a query request through the browser application 104. The query processing server 108 receives the request and produces a distance (i.e., an exact distance) among the nodes or vertices stored in the database 110 for reaching the destination node (or vertex) from the start node (or vertex). The query processing server 108 then sends that exact distance back to the requesting computing device 100. Alternatively, the query processing service 106 is hosted on the computing device 100, and the computing device 100 need not communicate with a local area network 102.

The point-to-point (P2P) shortest path problem is a classical problem with many applications. Given a graph G with non-negative arc lengths as well as a vertex pair (s,t), the goal is to find the distance from s to t, i.e., the length of the shortest path from s to t. The graph may represent a road map, for example. For example, route planning in road networks solves the P2P shortest path problem. However, there are many uses for an algorithm that solves the P2P shortest path problem, and the techniques, processes, and systems described herein are not meant to be limited to maps, and may be used for any large or massive network such as social networks, search, computational biology, computer networks, and road networks.

Thus, a P2P algorithm that solves the P2P shortest path problem is directed to finding the shortest distance (or an exact distance or other distance, depending on the implementation) between any two points in a graph. Such a P2P algorithm may comprise several stages including a preprocessing stage and a query stage. The preprocessing phase may take as an input a directed graph. Such a graph may be represented by $G=(V,A)$, where V represents the set of vertices in the graph and A represents the set of edges or arcs in the graph. The graph comprises several vertices (points), as well as several edges. The preprocessing phase may be used to improve the efficiency of a later query stage, for example.

During the query phase, a user may wish to find the shortest path between two particular nodes. The origination node may be known as the source vertex, labeled s, and the destination node may be known as the target vertex, labeled t. For example, an application for the P2P algorithm may be to find the shortest distance between two locations on a road map. Each destination or intersection on the map may be represented by one of the nodes, while the particular roads and highways may be represented by an edge. The user may then specify their starting point s and their destination t.

Thus, to visualize and implement routing methods, it is helpful to represent locations and connecting segments as an abstract graph with vertices and directed edges. In this example, vertices correspond to locations, and edges correspond to road segments between locations. The edges may be weighted according to the travel distance, transit time, and/or other criteria about the corresponding road segment. The general terms "length" and "distance" are used in context to encompass the metric by which an edge's weight or cost is measured. The length or distance of a path is the sum of the weights of the edges contained in the path. For manipulation by computing devices, graphs may be stored in a contiguous block of computer memory as a collection of records, each record representing a single graph node (vertex) or edge along with associated data.

Figure 2:
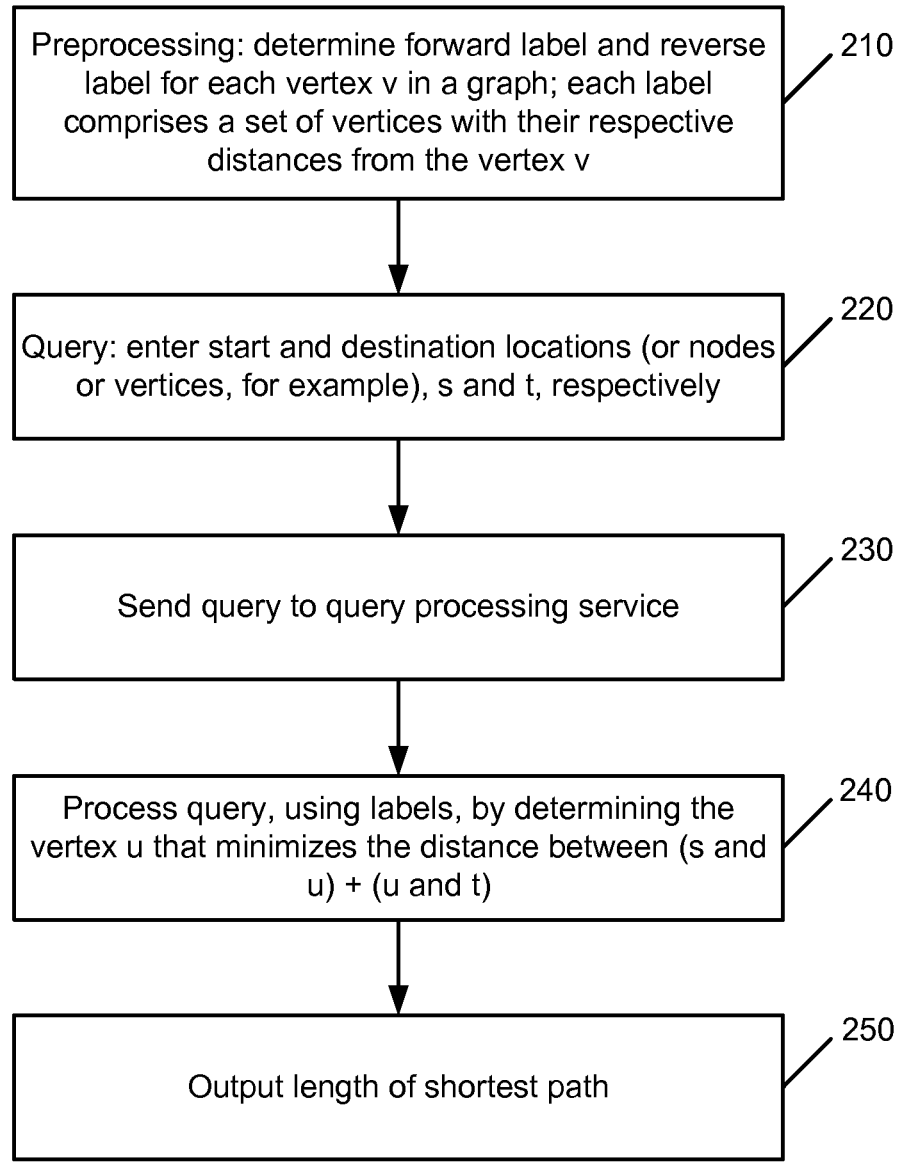
FIG. 2 is an operational flow of an implementation of a method using a labeling technique for determining the length of a shortest path between two locations, such as two nodes or two vertices.

A labeling technique may be used in the determination of point-to-point shortest paths or any other distance queries, such as distance queries on large or massive networks. FIG. 2 is an operational flow of an implementation of a method 200 using a labeling technique for determining the length of a shortest path between two locations (e.g., two nodes or two vertices). A label for a vertex v is a set of hubs to which the vertex v stores its distance. The labels are such that any two vertices s and t share at least one hub on the shortest s-t path.

During the preprocessing stage, at 210, the labeling method determines a forward label $L_f(v)$ and a reverse label $L_r(v)$ for each vertex v. Each label comprises a set of vertices w, together with their respective distances from the vertex v (in $L_f(v)$) or to the vertex v (in $L_r(v)$). Thus, the forward label comprises a set of vertices w, together with their respective distances d(v,w) from v. Similarly, the reverse label comprises a set of vertices u, each with its distance d(u,v) to v. A labeling is valid if it has the cover property that for every pair of vertices s and t, $L_f(s) \cap L_r(t)$ contains a vertex u on a shortest path from s to t (i.e., for every pair of distinct vertices s and t, $L_f(s)$ and $L_r(t)$ contain a common vertex u on a shortest path from s to t).

At query time, at 220, a user enters start and destination locations (or two points, vertices, or nodes on the network or graph), s and t, respectively (e.g., using the computing device 100), and the query (e.g., the information pertaining to the s and t vertices) is sent to a query processing service (e.g., the query processing service 106) at 230. The s-t query is processed at 240 by finding the vertex $u \in L_f(s) \cap L_r(t)$ that minimizes the distance (dist(s,u)+dist(u,t)). The corresponding path is outputted to the user at 250 as the shortest path or distance.

In an implementation, a labeling technique may use hub based labeling. Recall the preprocessing stage of a P2P shortest path algorithm may take as input a graph G=(V,A), with |V|=n, |A|=m, and length l(a)>0 for each arc a. The length of a path P in G is the sum of its arc lengths. The query phase of the shortest path algorithm takes as input a source (or start) s and a target (or destination) t and returns the distance dist(s,t) between them, e.g., the length of the shortest path between the source s and the target t in the graph G. As noted above, the standard solution to this problem is Dijkstra's algorithm, which processes vertices in increasing order of distance from the source s. For every vertex v, it maintains the length d(v) of the shortest s-v path found so far, as well as the predecessor (also referred to as the parent) p(v) of vertex v on the path. Initially, d(s)=0, d(v)=∞ for all other vertices, and p(v)=null for all v. At each step, a vertex v with minimum d(v) value is extracted from a priority queue and scanned: for each arc (v,w)∈A, if d(v)+l(v,w)<d(w), set d(w)=d(v)+l(v,w) and p(v)=w. The process terminates when the target t is extracted.

The hub based labeling technique may be improved using a variety of techniques, such as hierarchical hub labels including ordering, and compression.

Thus, to summarize the above, the input to the distance query problem is a directed graph G=(V,A) with a positive length function l: A→R+, with n=|V| and m=|A|. The length of a shortest path (or the distance) from vertex v to vertex w is denoted by dist(v,w). A distance query takes a pair of vertices (s,t) as input, and outputs dist(s,t).

A labeling algorithm preprocesses the graph to compute a label for every vertex so that an s-t query can be answered using only the labels of s and t. The known hub labeling algorithm may be used with a two-part label L(v) for every vertex v: a forward label $L_f(v)$ and a reverse label $L_r(v)$. For undirected graphs, only one of these labels suffices. The forward label $L_f(v)$ comprises a sequence of pairs (w, dist(v,w)), with w∈V; similarly, $L_r(v)$ has pairs (u, dist(u,v)). Vertices w and u are referred to as hubs of v. To simplify notation, labels may be interpreted as sets of hubs; the notation $v \in L_f(u)$ thus means that label $L_f(u)$ contains a pair (v, dist(u,v)). The size of a forward or reverse label, denoted by $|L_f(v)|$ or $|L_r(v)|$, is the number of hubs it contains. A labeling is the set of all labels for all vertices v∈V. The average label size of a graph is the number of hubs in the labeling divided by the number of labels (which is n for undirected graphs and 2n for directed ones). Labels obey the cover property: for any two vertices s and t, the set $L_f(s) \cap L_r(t)$ contains at least one hub v that is on the shortest s-t path.

Given the labels, hub label queries are straightforward: to find dist(s,t), find the hub $v \in L_f(s) \cap L_r(t)$ that minimizes dist(s,v)+dist(v,t). If the entries in each label are sorted by hub ID, this can be done by a coordinated sweep over both labels. It is not necessary to assume that shortest paths are unique; to avoid confusion, refer to pairs [u,w] instead of paths u-w. A vertex v covers (or hits) a pair [u,w] if dist(u,v)+dist(v,w)=dist(u,w), i.e., if at least one shortest u-w path contains v. Note that, for directed graphs, pairs are ordered, i.e., [u,v] is not the same as [v,u].

Figure 3:
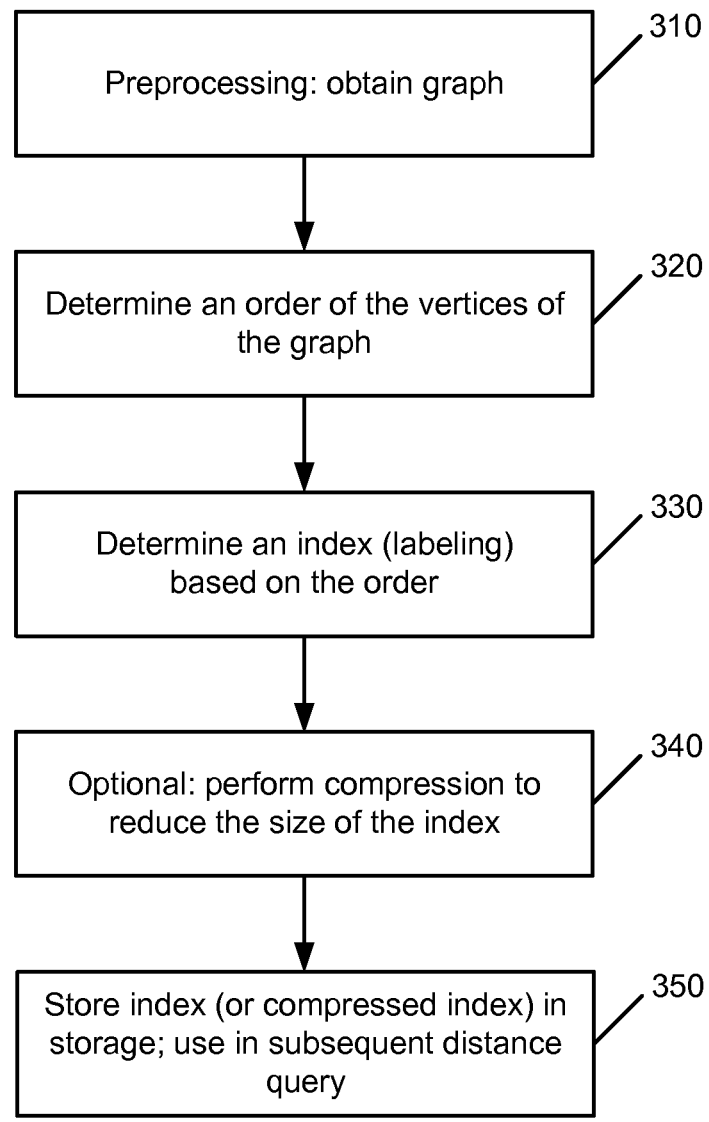
FIG. 3 is an operational flow of an implementation of a method using a hierarchical hub labeling technique for preprocessing data to be used in a subsequently received distance query.

The hub labeling technique may be improved upon using hierarchical hub labeling (HHL) techniques, some of which are described herein. FIG. 3 is an operational flow of an implementation of a method 300 using an HHL technique for preprocessing data to be used in a subsequently received distance query. The method 300 may be performed by a query processing server and/or service, such as the query processing server 108 comprising the query processing service 106.

At 310, during a preprocessing stage, a graph is obtained, e.g., from storage or from a user. At 320, an order of the vertices of the graph is computed or otherwise determined for the input graph, using techniques described further herein. The order is used, at 330, to compute or determine an index (labeling) that will be used in subsequently received exact distance queries. At 340, an optional compression step (various techniques are described further herein) reduces the space consumption of this index. The index is stored in storage at 350, and may be retrieved and used in the processing of a subsequently received distance query, such as an exact distance query on a massive network.

More particularly, given a labeling, let v≤w, if w is a hub of L(v). A hub labeling is defined as hierarchical if ≤ is a partial order. Intuitively, v≤w if w is "more important" than v, in the sense that v may know about w but not vice-versa. Natural heuristics for finding labelings produce hierarchical ones.

It has been shown that given an ordering rank(•) on the vertices, one can compute the smallest HHL consistent with this ordering in polynomial time using a choice of various algorithms. This canonical labeling has the property that vertex v belongs to $L_f(u)$ if and only if there exists w such that v is the highest-ranked vertex that covers [u,w]. Similarly, vertex v belongs to $L_r(w)$ only if there exists u such that v is the highest-ranked vertex that covers [u,w].

Regarding orderings, which as noted above are transformed into a hierarchical labeling, finding a good ordering (i.e., one that leads to small labelings) is now described. In an implementation, a basic algorithm defines the order greedily. It picks as highest-ranked vertex the one that hits the most shortest paths in the graph. In general, the i-th highest ranked vertex (hub) is the one that hits the most previously uncovered paths (i.e., not covered by the i−1 hubs already picked).

Figure 4:
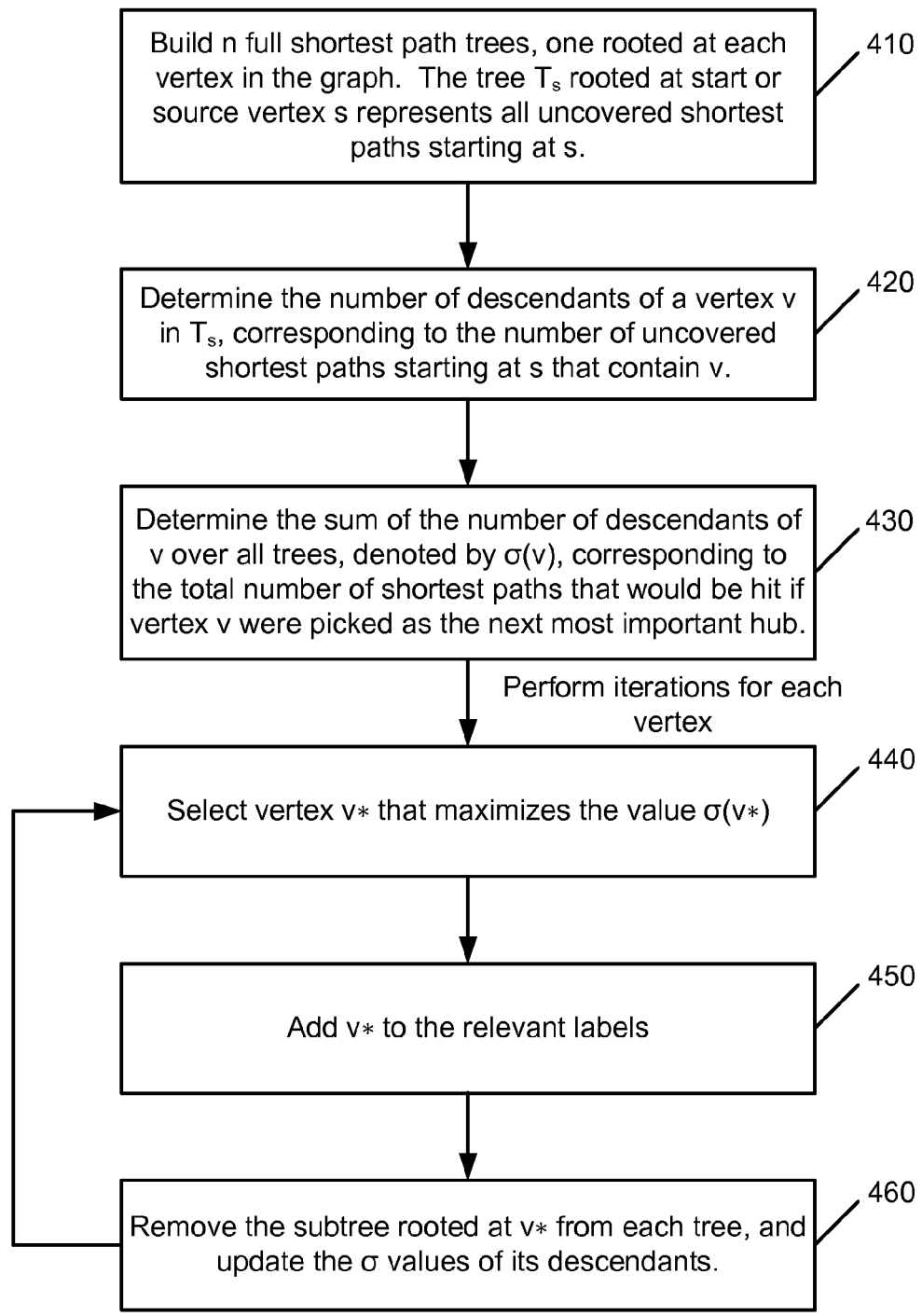
FIG. 4 is an operational flow of an implementation of a method using a hub based labeling technique that may be used for determining a distance between two locations.

FIG. 4 is an operational flow of an implementation of a method 400 using a hub based labeling technique that may be used for determining a distance between two locations, nodes, or vertices. The method 400 may be performed by a query processing server and/or service, such as the query processing server 108 comprising the query processing service 106.

The method 400 starts at 410 by building n full shortest path trees, one rooted at each vertex in the graph. The tree $T_s$ rooted at start or source vertex s represents all uncovered shortest paths starting at s. This assumes that shortest paths are unique (and given by the trees): within the algorithm, only vertices on the s-t path in $T_s$ can cover the pair [s,t].

At 420, the number of descendants of a vertex v in $T_s$ is determined, and corresponds to the number of uncovered shortest paths starting at s that contain v. At 430, the sum of the number of descendants of v over all trees, denoted by $\sigma(v)$, is determined, and corresponds to the total number of shortest paths that would be hit if vertex v were picked as the next most important hub.

At 440, processing continues with iterations being run for each vertex. Each iteration of the algorithm picks as the next hub the vertex v* for which $\sigma(v^*)$ is maximum. To prepare for the next iteration, the algorithm removes the subtree rooted at v* from each tree and updates the $\sigma(\cdot)$ values of all descendants and ancestors of v*. More particularly, at 440, the vertex v* is selected that maximizes the value $\sigma(v^*)$. At 450, v* is added to the relevant labels. At 460, the subtree rooted at v* is removed from each tree, updating the $\sigma$ values of its descendants. Processing returns to 440.

Figure 5:
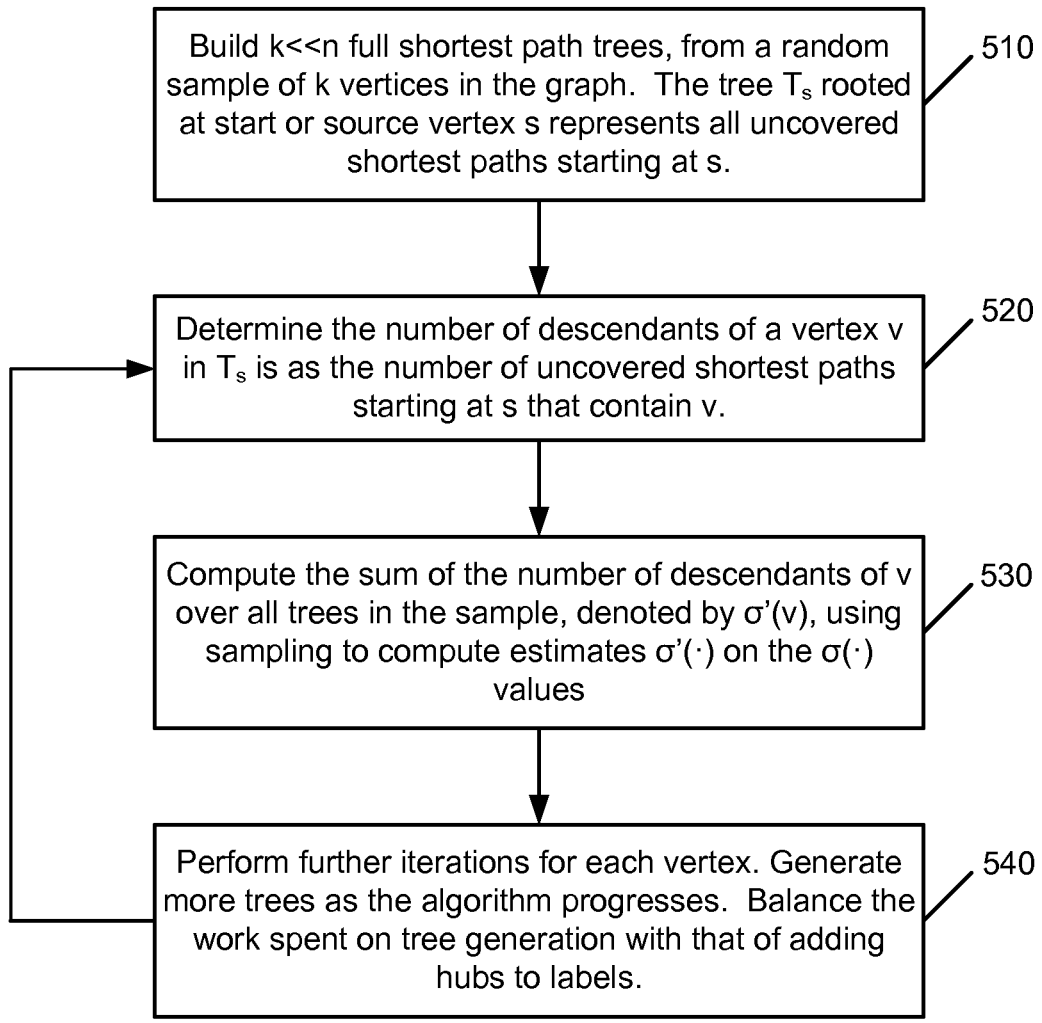
FIG. 5 is an operational flow of an implementation of a method using a hub based labeling technique involving sampling and estimating that may be used with much larger graphs.

FIG. 5 is an operational flow of an implementation of a method 500 using a hub based labeling technique involving sampling and estimating that may be used with much larger graphs. The method 500 starts at 510 by building k<<n full shortest path trees, from a random sample of k vertices in the graph. The tree $T_s$ rooted at start or source vertex s represents all uncovered shortest paths starting at s. This assumes that shortest paths are unique (and given by the trees): within the algorithm, only vertices on the s-t path in $T_s$ can cover the pair [s,t]. At 520, the number of descendants of vertex v in $T_s$ is determined as the number of uncovered shortest paths starting at s that contain v.

At 530, the sum of the number of descendants of v over all trees in the sample, denoted by $\sigma'(v)$ is computed. Sampling is used to compute these estimates $\sigma'(\cdot)$ on the $\sigma(\cdot)$ values (the total number of descendants over all trees), saving time and space. The estimates are precise enough to distinguish important vertices (those for which $\sigma(\cdot)$ is large) from unimportant ones. Once a vertex is picked (which can be done efficiently with a priority queue, in an implementation), counters can be updated, with vertices removed from the sampled trees. This gives reasonable results for some graph classes, but some issues arise when k is small. Estimates are fairly accurate for very important vertices (with many descendants in most trees), but less accurate for less important ones. As sampled trees get smaller, there is not enough information to assess less important vertices. Therefore, $\sigma'(v)$ counts exactly how many descendants v has in the trees that were built. It is used to estimate $\sigma(v)$, which is the total number of descendants over all trees (including those that were not built). In other words, some trees are built to estimate the number of descendants in all trees, including those that are not built.

This may be addressed by generating more trees as the algorithm progresses at 540. These are shortest path trees, but not necessarily full: they can exclude the descendants of vertices already picked as hubs in previous iterations of the algorithm. This saves time and space. In an implementation, one can roughly balance the work spent on tree generation with that of adding hubs to labels. Let $c_t$ be the total number of arcs scanned and hubs touched when growing new trees (the original k trees are free); define $c_l$ similarly, for operations during label generation. Before determining the next vertex in the ordering, check if $c_t < \beta c_l$ holds; if so, generate new trees from random roots not yet picked until $c_t$ exceeds $\beta c_l$. The input parameter $\beta$ controls the balance between label computation and tree generation (e.g., use $\beta=1$, though any value may be used depending on the implementation). In addition, maintain at least one tree and, to keep the space usage bounded, do not generate new trees if the total number of vertices on all trees exceeds $\gamma k n$ (even if $c_t < \beta c_l$). As an example, set $\gamma$ to 10, though any value may be used as set by an administrator or user for example.

In an implementation, different representations may be used for large and small trees. A large tree (e.g., with at least n/8 vertices) is represented as an n-sized array; the i-th position contains the parent of vertex i, or null if the vertex is not in the tree. Each smaller tree is represented as a hash table that associates each vertex with its parent; vertices not in the tree do not appear in the table. Note that the same tree may switch representations as it shrinks during the algorithm.

The total number of descendants in the sample may be used to estimate the total over all n trees. Although this seems natural, the variance of this estimator may be high. In particular, it may severely overestimate the importance of vertices that are at (or near) the root of one of the trees. An unimportant vertex that happens to be the root of one sample tree will appear to cover many more paths than it really does. This may be remedied by replacing the sum (or average) by a more robust measure, such as the median or any fixed percentile.

In an implementation, instead of maintaining a single counter $\sigma'(v)$ for each vertex v, maintain c counters $\sigma'_1(v)$, $\sigma'_2(v), \ldots, \sigma'_c(v)$, for some constant c. The counter $\sigma'_i(v)$ is the sum of the number of descendants of v over all trees $t_j$ such that i=(j mod c). Note that $t_j$ is the j-th tree in the sample, not the tree rooted at j. These counters can be updated when new trees are added or subtrees are removed. These counters can be used to eliminate outliers when evaluating the quality of v. One approach is to discard the counter i that maximizes $\sigma_i(v)$ and take as estimator the average value of the remaining counters. The intuition here is straightforward: if v is close to the root of one tree, only one counter will be affected. In general, increasing the number c of counters per vertex leads to smaller labels but increases preprocessing time, because the priority of a vertex is evaluated by looking at all c counters.

Using the techniques described above, small labels for a wide variety of graph classes may be determined quickly. In some instances, however, the space used to maintain these labels can be large. Implementations are now described to represent them compactly. Compression may be used, e.g., to represent each label independently but use fewer bits to represent each of its elements (distances or IDs). Techniques are described that achieve even lower space usage without sacrificing query times.

For basic compression, each label $L_f(u)$ can be viewed as an array of pairs (v, dist(u,v)). It may be beneficial to first represent all hubs, then the corresponding distances (in the same order). Because queries only look at distances when hubs match, this may save some cache misses. One way to save space is to use fewer bits to represent hub IDs and distances. In an implementation, distances may be represented with 8, 16, or 32 bits depending on the input.

Regarding hub IDs, typical approaches use 32 bits to represent most hub IDs, but only 8 bits for hubs 0 to 255. Although this represents a very small fraction of all n hubs, the hubs may be renamed so that IDs 0 to 255 are assigned to the most important (higher-ranked) vertices. On road networks, a large fraction of the vertices in every label are in this set. Space is reduced by around 10%, and queries become faster. Modifications to this approach, including delta representation and advanced reordering, are described to make it more effective on a wider range of instances.

Figure 6:
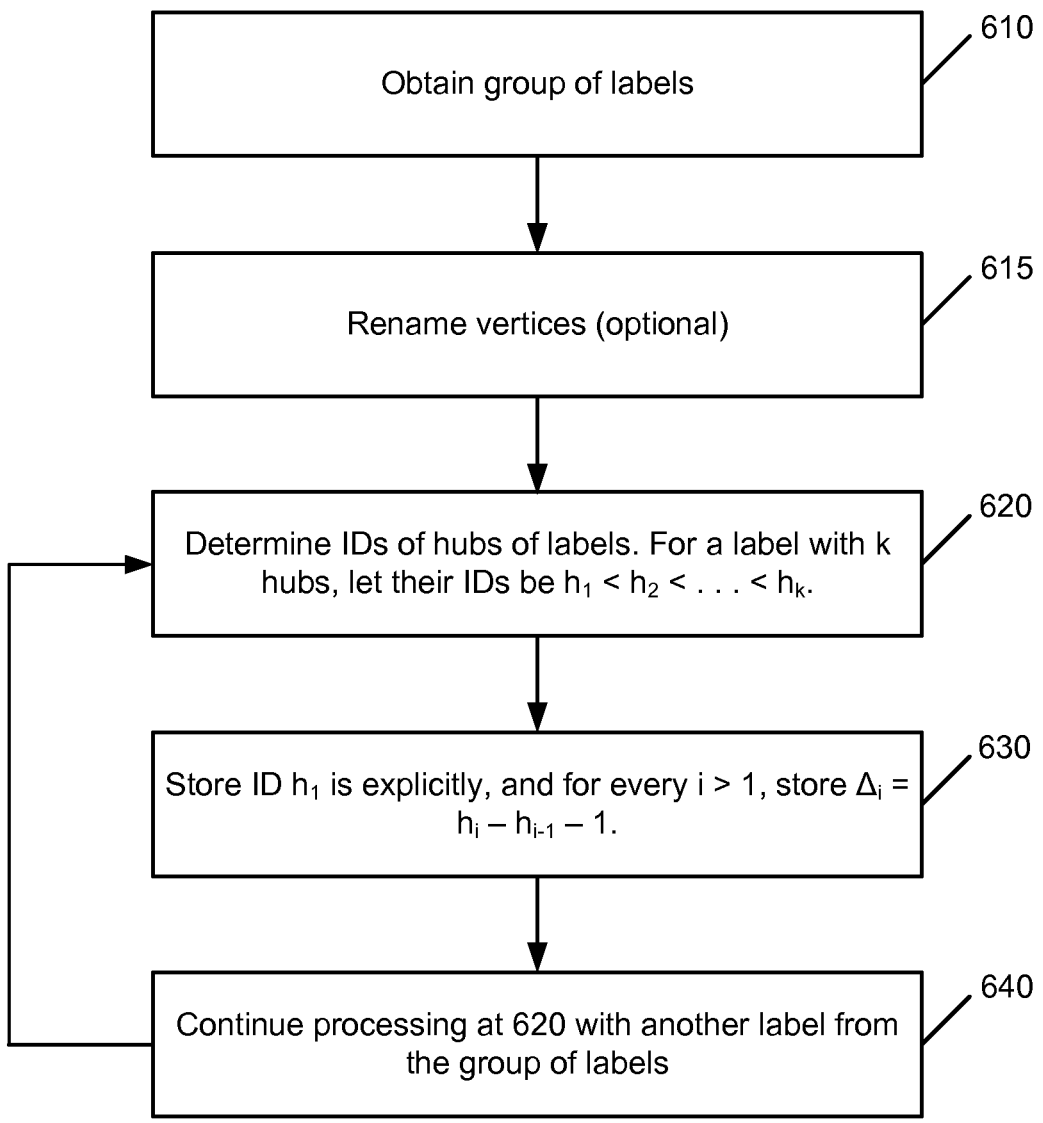
FIG. 6 is an operational flow of an implementation of a method using a delta representation technique for label compression.

FIG. 6 is an operational flow of an implementation of a method 600 using a delta representation technique for label compression. In this implementation, hub IDs are stored in the label in difference form. At 610, a label of a group of labels is obtained. Optionally depending on the implementation, at 615, the vertices are renamed, as described further below. At 620, the identifiers (IDs) of hubs in the label are determined. For a label with k hubs, let their IDs be $h_1 < h_2 < \ldots < h_k$. At 630, the ID $h_1$ is stored explicitly, but for every $i > 1$, store $\Delta_i = h_i - h_{i-1} - 1$. This allows for a representation of differences of 1 to 256. At 640, continue processing at 620 with another label from the group of labels.

In this manner, for example, a label with hubs (0 16 29 189 299 446 529) is represented as (0 15 12 159 109 146 82). Because queries always traverse labels in order, $h_i$ can be retrieved as $\Delta_i + h_{i-1} + 1$. Because $\Delta_i < h_i$, this increases the range of entries that can be represented with fewer bits. In the example above, 8 bits suffice for all entries. To keep queries straightforward, avoid variable-length encoding. Instead, divide the label into two blocks, using 8-bit and 32-bit representation. Once the 8-bit block is finished, use 32 bits for the remainder of the label.

Another technique is to rename vertices to take advantage of delta representation. Intuitively, the number of hub entries that can be represented with 8 bits is maximized. One approach is to reorder hubs by rank or by frequency, with smaller IDs assigned to hubs that appear in more labels.

Figure 7:
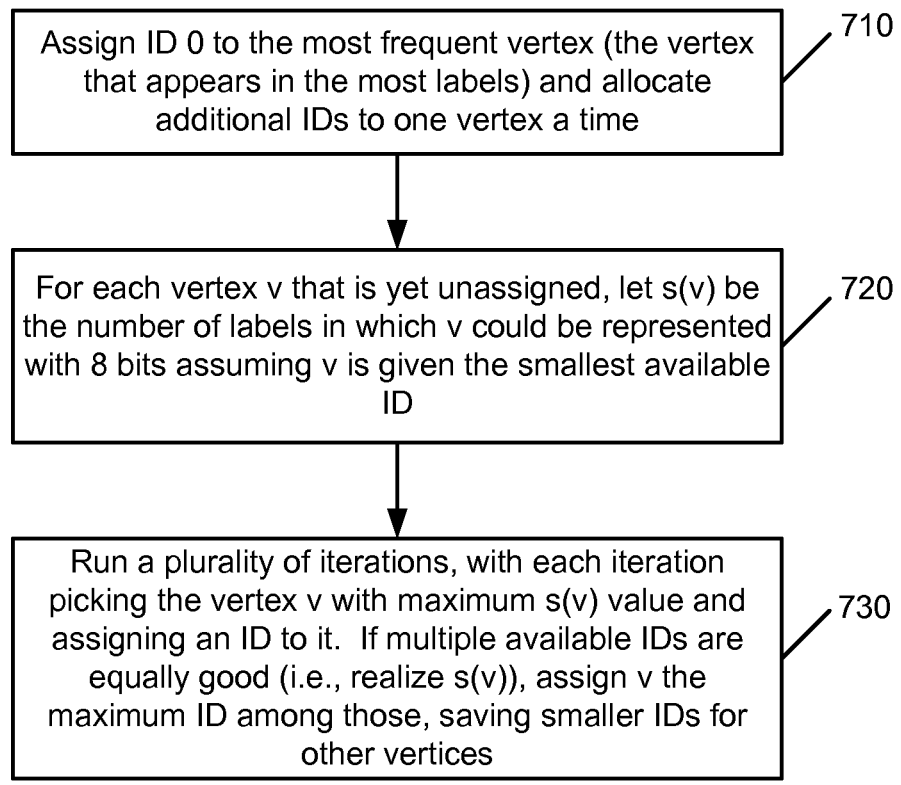
FIG. 7 is an operational flow of an implementation of a method using an advanced reordering technique for label compression.

In an implementation, an advanced reordering technique may be used for the delta representation. FIG. 7 is an operational flow of an implementation of a method 700 using an advanced reordering technique for label compression.

At 710, assign ID 0 to the most frequent vertex (the vertex that appears in the most labels) and allocate additional IDs to one vertex a time. At 720, for each vertex v that is yet unassigned, let s(v) be the number of labels in which v could be represented with 8 bits assuming v is given the smallest available ID. Initially, s(v) is the number of labels containing v, but its value may decrease as the algorithm progresses, because fewer IDs remain available.

At 730, run a plurality of iterations, with each iteration picking the vertex v with maximum s(v) value and assigning an ID to it. If multiple available IDs are equally good (i.e., realize s(v)), assign v the maximum ID among those, saving smaller IDs for other vertices. In particular, the second most frequent vertex could have any ID between 1 and 256 and still be represented as 8 bits, so assign ID 256 to it.

More particularly, for every label L (forward or reverse (i.e., backward)), let its horizon h(L) be the maximum ID that a hub in L could be assigned and still be represented in 8 bits (this is the ID of the last 8-bit entry already in L plus 256). L is open if there exists at least one free ID i such that $i \leq h(L)$, and closed otherwise. Note that s(v) is the number of open labels that contain v. Let $\mu(v)$ be the minimum h(L) over all open labels that contain v. If v* has the highest s(v*) value, assign to v* the maximum free ID $i \leq \mu(v^*)$.

For potentially higher compression rates, the known hub label compression (HLC) algorithm may be used. It interprets each label as a tree and saves space by representing each unique subtree (which may occur in many labels) only once. More precisely, the hubs in a forward label $L_f(u)$ can be represented as a tree rooted at u. For canonical hierarchical labels, the parent of $w \in L_f(u) \setminus \{u\}$ in the tree is the highest-ranked vertex $v \in L_f(u) \setminus \{w\}$ that hits [u,w]. Similarly, the tree representing a reverse label $L_r(u)$ is rooted at u, with the parent of $w \in L_b(u) \setminus \{u\}$ being the highest-ranked vertex $v \in L_b(u) \setminus \{w\}$ that hits [w,u].

The same subtree often appears in the labels of several different vertices. Each unique subtree may be represented as a token consisting of (1) a root vertex r; (2) the number k of child tokens; (3) a list of k pairs (i, $d_i$) indicating that the root of the child token with ID i is within distance $d_i$ from r. A token with no children (k=0) is a trivial token, and is represented implicitly. Each nontrivial unique token is stored only once. In addition to the tokens themselves, the data structure also maintains an index mapping each vertex v to its two anchor tokens, the roots of the tree representing $L_f(v)$ and $L_r(v)$.

With this representation, an s-t distance query works in two phases. The first, label retrieval, reconstructs the labels $L_f(s)$ and $L_r(t)$ by traversing the corresponding trees in breadth-first search (BFS) order and aggregating distances appropriately. The second phase performs the intersection between the labels, finding the vertex $v \in L_f(s) \cap L_b(t)$ that minimizes dist(s,v)+dist(v,t). Because the entries in the labels produced by the first phase are not necessarily sorted by hub ID, the intersection works by hashing rather than merging.

Figure 8:
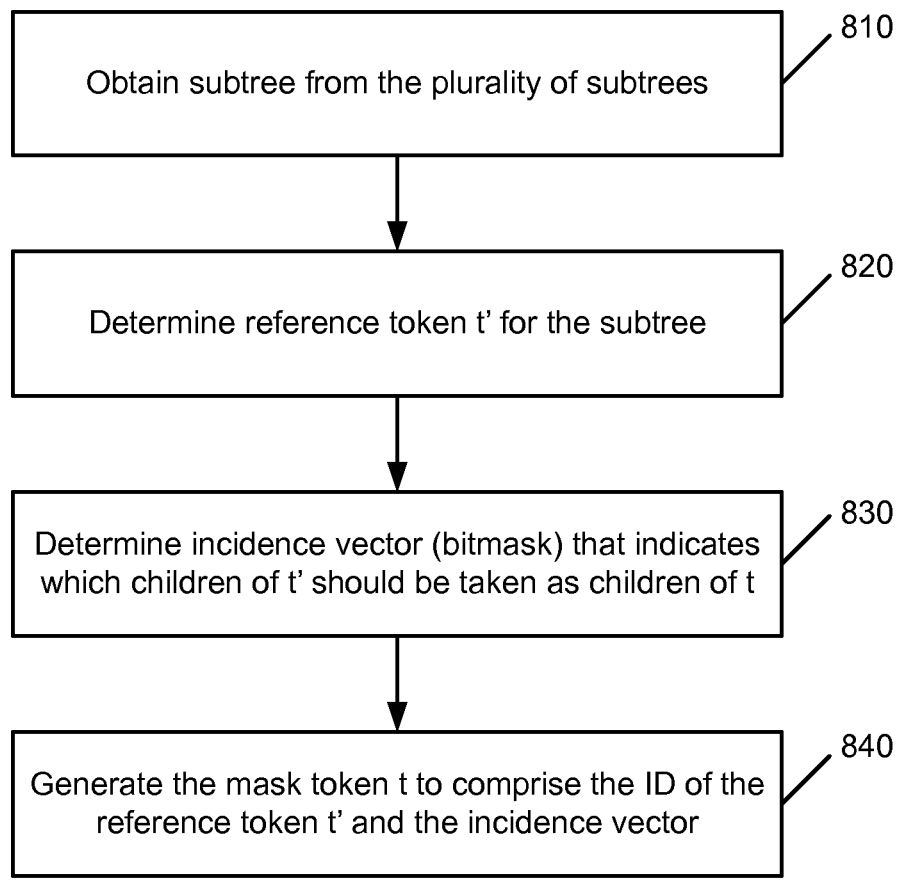
FIG. 8 is an operational flow of an implementation of a method using mask tokens for label compression.

In an implementation, an enhanced compression technique uses mask tokens. FIG. 8 is an operational flow of an implementation of a method 800 using mask tokens for label compression. A mask token represents a unique subtree; therefore, the method 800 may be run for each subtree.

At 810, a subtree is obtained from the plurality of subtrees. At 820, a reference token t' is determined for the subtree. The reference token t' is a token (as described above) with the same root vertex as the subtree and a superset of its children. At 830, an incidence vector (bitmask) is determined that indicates which children of t' should be taken as children of t. The mask token t then is generated at 840 to comprise the ID of the reference token t' and the incidence vector.

Note that both t and t' have the same root. Because tokens rooted at the same vertex v often have similar sets of children, expressing some tokens indirectly (as subsets of others) avoids the need to represent some children multiple times.

In an implementation, supertokens may be used. A supertoken has the same structure as a standard token (with a root and a list of children), but it represents the union of several tokens, defined as the union of their children. In an implementation, for each vertex v create a supertoken representing the union of all standard tokens rooted at v. While the supertoken itself does not necessarily represent any actual subtree that appears in the labeling, such subtrees can be represented as mask tokens using the supertoken as a reference.

Because a supertoken represents the union of all tokens rooted at v, the number k of children in this supertoken can be quite large. Because each of the (potentially numerous) mask tokens that refer to this token needs a k-bit mask, space requirements can be large. It has been observed that many original tokens rooted at v tend to have a relatively small number of children, leading most entries in the mask to be zero. Representing these masks more compactly may lead to large savings. One approach is to use run-length encoding (instead of an incidence vector) to represent the bitmask.

Alternatively, a two-level approach may be used instead. Conceptually, split a k-bit mask into b=[k/8] buckets, each representing a set of (up to) 8 consecutive bits. For example, a label with k=45 could be represented by six 8-bit buckets. Bucket 0 represents bits 0 to 7, bucket 1 represents bits 8 to 15, and so on, until bucket 5 (representing bits 40 to 44). To save space, only non-empty buckets are represented explicitly. For example, store an index array indicating which q buckets (where $1 \leq q \leq b$) are nonempty, followed by q 8-bit incidence arrays representing the nonempty buckets, in order. Use [b/8]=[[k/8]/8] bytes to store the index; the index size can be computed at query time, because k is stored explicitly in the supertoken.

In an implementation, the children may be reordered. The effectiveness of this technique depends on there being few nonempty buckets on average. Note that this depends not only on the number of "1" entries in each bit mask, but also on their distribution among the buckets. In an implementation, these entries to be clustered. Because the order in which children appear in a supertoken is immaterial for correctness, they can be permuted to make the "1" entries more concentrated. The following heuristic may be used: For each child x of v, count the number $c_v(x)$ of standard tokens rooted at v in which x appears, then sort the children of the supertoken rooted at v in decreasing order of $c_v(x)$.

Figure 9:
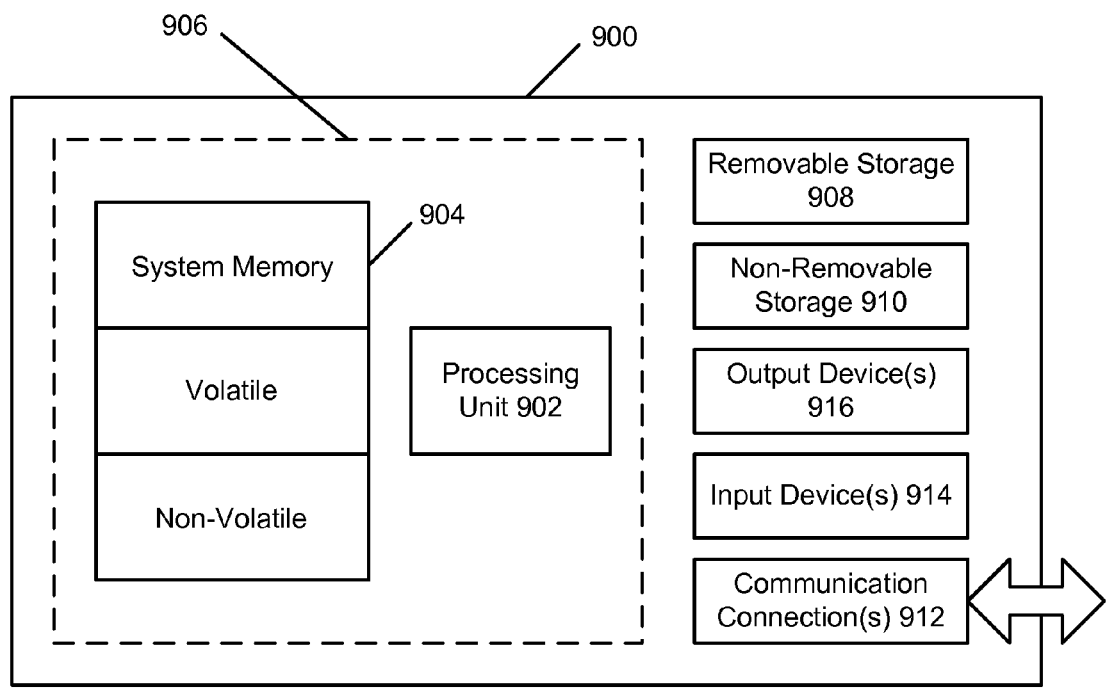
FIG. 9 shows an exemplary computing environment.

FIG. 9 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by computing device 900 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of determining a distance between two vertices, comprising:
   receiving as input, at a computing device, a graph comprising a plurality of vertices;
   generating a plurality of labels for each vertex of the graph wherein for each vertex, each label comprises both a set of vertices referred to as hubs and the distances between the hubs in the label and the vertex;
   performing hierarchical hub labeling on the labels, wherein performing hierarchical hub labeling comprises:
   determining an order of the vertices of the graph; and determining an index based on the order; and storing data corresponding to the vertices and labels as preprocessed graph data in storage associated with the computing device.

2. The method of claim 1, wherein storing data corresponding to the vertices and labels as preprocessed graph data in storage comprises storing the index in storage as preprocessed graph data.

3. The method of claim 1, wherein determining the order of the vertices of the graph comprises computing the total number of descendants of each vertex in a plurality of shortest path trees rooted at a plurality of source vertices.

4. The method of claim 3, wherein the shortest path tree rooted at the source vertex represents all uncovered shortest paths starting at the source vertex.

5. The method of claim 1, further comprising performing compression on the index to reduce the size of the index.

6. The method of claim 5, wherein the plurality of labels for each vertex of the graph comprises a forward label and a reverse label, wherein the forward label comprises the set of vertices referred to as forward hubs and the distances from the vertex to each forward hub, and wherein the reverse label comprises the set of vertices referred to as reverse hubs and the distances from each reverse hub to the vertex.

7. The method of claim 6, wherein the compression comprises label compression.

8. The method of claim 7, wherein the label compression comprises using a delta representation process in which hub identifiers are stored in the label in difference form.

9. The method of claim 7, wherein the label compression comprises using an advanced reordering process to assign an identifier of zero to the most frequent vertex and allocate additional identifiers to one vertex a time.

10. The method of claim 7, wherein the label compression comprises using a plurality of mask tokens.

11. The method of claim 1, wherein the graph represents a network of nodes.

12. The method of claim 1, wherein the method is implemented for an exact distance query on a massive network.

13. A method of determining a distance between two nodes on a massive network, comprising:

preprocessing, at a computing device, a graph comprising a plurality of vertices to generate preprocessed data comprising a plurality of labels for each vertex of the graph, wherein for each vertex, each label comprises a set of vertices and the distances between the vertices in the set of vertices and the vertex, wherein the preprocessing comprises determining an order of the vertices of the graph, and determining an index based on the order;

receiving a query at the computing device;

determining a source vertex and a destination vertex based on the query, by the computing device;

performing, by the computing device, a distance computation on the preprocessed data with respect to the source vertex and the destination vertex to determine a distance between the source vertex and the destination vertex; and outputting the distance, by the computing device.

14. The method of claim 13, wherein the preprocessing comprises performing hierarchical hub labeling on the labels.

15. The method of claim 13, wherein the preprocessing further comprises performing compression on the index.

16. The method of claim 15, wherein performing the compression comprises using label based compression.

17. A system for determining a distance between two nodes on a massive network, comprising:

a computing device; and a query processing server adapted to:

generate a plurality of labels for each vertex of a graph wherein for each vertex, each label comprises both a set of vertices referred to as hubs and the distances between the hubs in the label and the vertex;

perform hierarchical hub labeling on the labels, including determining an order of the vertices of the graph, determining an index based on the order, and performing compression on the index;

store the compressed index as preprocessed graph data in storage associated with the computing device; and process a query using the preprocessed graph data to determine a distance on the massive network between a source vertex and a destination vertex; and output the distance.

18. The system of claim 17, wherein the distance is an exact distance.

19. The system of claim 17, wherein performing compression on the index comprises at least one of a delta representation process, a reordering process, and using a plurality of mask tokens.

* * * * *